United States Patent [19]
Patton et al.

[11] Patent Number: 5,757,468
[45] Date of Patent: May 26, 1998

[54] METHOD AND APPARATUS FOR PRODUCING PHOTOGRAPHIC PRINTS WITH SOUND INDICIA THEREON

[76] Inventors: David Lynn Patton; Stephen John Rowan; Cynthia Sue Bell, all of Eastman Kodak Company, Rochester, N.Y. 14650

[21] Appl. No.: 705,350

[22] Filed: Aug. 29, 1996

[51] Int. Cl.$^6$ .............................. G03B 27/32; G03B 27/52
[52] U.S. Cl. .............................. 355/40; 355/39; 396/312
[58] Field of Search .......................... 355/39, 40, 41–44; 365/127; 396/312; 352/25–27; 376/312

[56] References Cited

U.S. PATENT DOCUMENTS 5,655,164   7/1995   Tsai ................................ 396/312

*Primary Examiner*—R. L. Moses
*Assistant Examiner*—Shival P. Virmanl
*Attorney, Agent, or Firm*—Francis H. Boos, Jr.

[57] ABSTRACT

Apparatus and method for printing sound code icons on photographic prints produced from filmstrips having images with varying orientation, size and or format. A sound-on-print print gate includes a pair of selectable LED icon printers for printing a binary coded sound icon on either edge of the photographic print depending on normal or inverted image orientation. The icon printers are mounted for translational movement lengthwise of the print paper, the positioning being determined by the format of the print: panoramic, normal or HDTV aspect ratios. A computer controlled system is disclosed which determines the orientation, size and format and positions the icon printers in response thereto at the print gate.

22 Claims, 9 Drawing Sheets

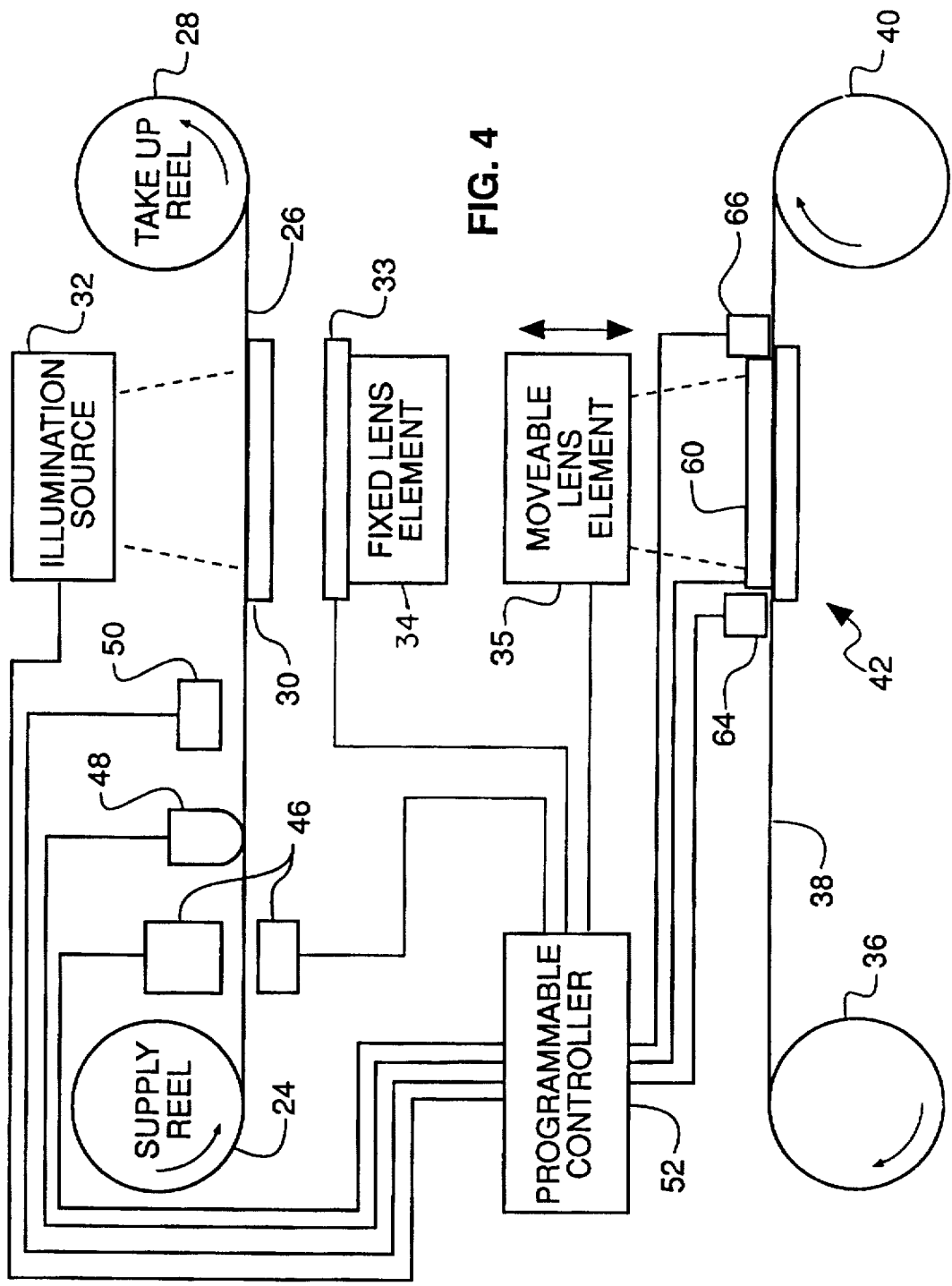

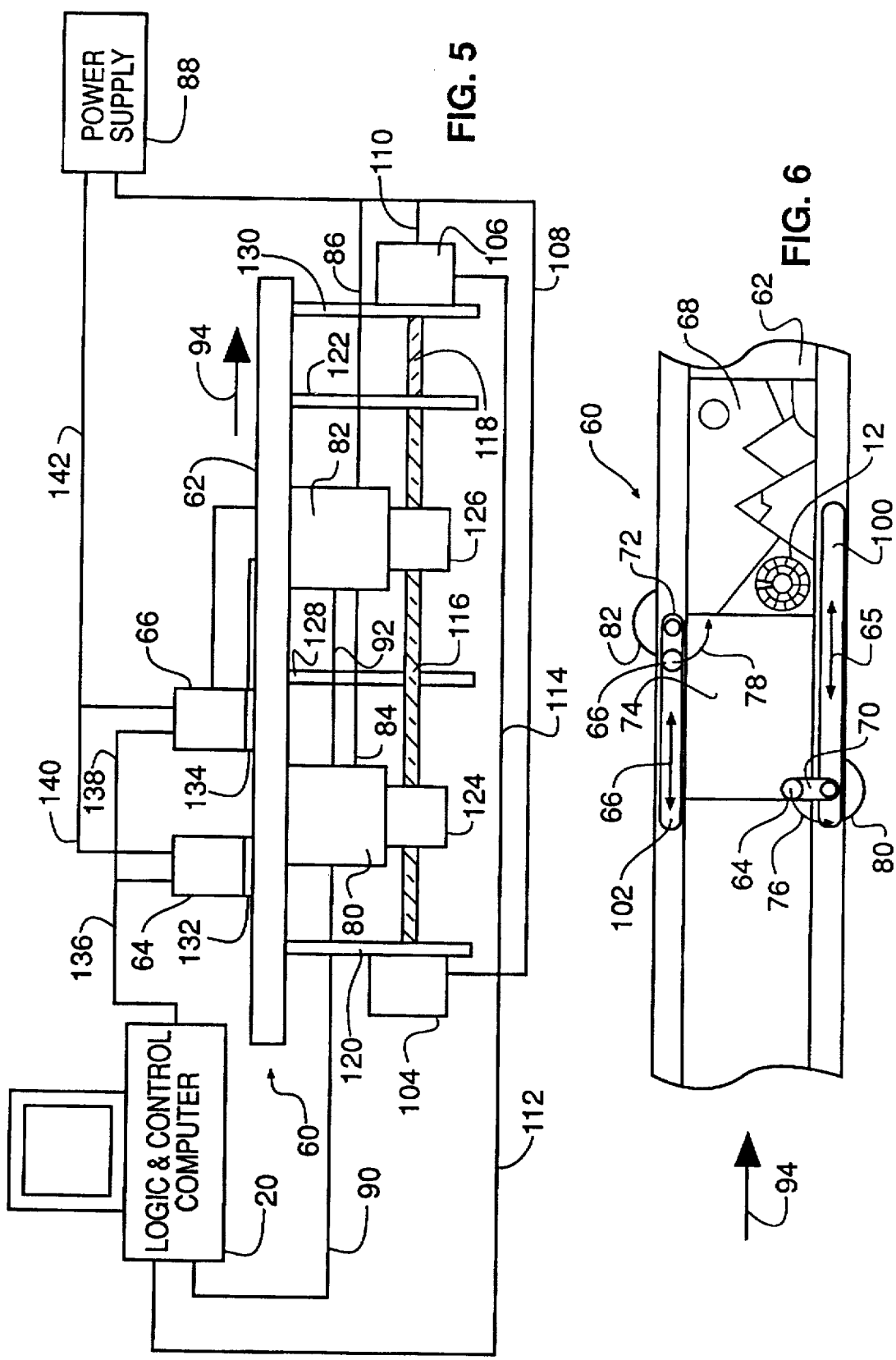

METHOD AND APPARATUS FOR PRODUCING PHOTOGRAPHIC PRINTS WITH SOUND INDICIA THEREON

CROSS-REFERENCE TO RELATED APPLICATION(S)

Reference is made to commonly assigned copending application Ser. No. 08/705,468 filed Aug. 29, 1996, entitled "APPARATUS AND METHOD FOR PRODUCING PHOTOGRAPHIC PRINTS WITH WRITEON BORDERS" in the names of J. A. Manico, D. L. Patton and P. H. Forest.

FIELD OF THE INVENTION

The invention relates generally to the field of still images having recorded sound associated with the still image. In one aspect, the invention relates to photofinishing apparatus and methods for reproducing a still image with a sound indicium imprinted on the image print to facilitate association of sound playback with the image during viewing of the image print.

BACKGROUND OF THE INVENTION

The ability to associate sound recorded in a camera with still image prints is of great interest to camera users. U.S. Pat. No. 4,905,029 is an example of prior art showing recording of sound on a magnetic strip which is either integrally formed with instant print material or is separable for later attachment to a processed image print. In U.S. Pat. No. 5,313,235, the camera records sound on a separate medium and exposes an image frame identifying bar code onto the film negative. The bar code is subsequently exposed onto the image print during photofinishing. The code serves as a print image identifier which associates the print with a segment recorded in a separate medium. A sensor connected to a separate playback device reads the code on the print and addresses the associated sound segment in the separate medium for sound playback. While of interest, this approach requires that the code be exposed onto the negative. This has the drawback that there is a risk the code will be obscured during masking that occurs during the print finishing process, unless the code is exposed obtrusively well within the image frame area. Also, since the code is in the negative, it will always be printed even if there is a desire not to associate sound with the print. There is therefore a need for a photofinishing process that enables the printing of a sound address code on an image print without relying on optical exposure from the negative.

FIG. 1 illustrates an example of a finished image print 10 with a sound address code printed as a sound icon 12 in the lower left hand corner of the print. It is desirable that the sound icon be presented generally in the same position relative to the print image, i.e. in the lower portion, relative to at least a majority of the viewed images and preferably near a corner. A difficulty of providing sound icons on prints is that images are printed with a variety of different formats, sometimes varying from image to image within a single filmstrip or order. FIG. 2 illustrates developed image prints on a strip of print paper 13, before cutting, where $\underline{P}$ represents a panoramic picture, $\underline{C}$ represents a conventional 3×5 format typical of 35 mm film and $\underline{H}$ represents an expanded width HDTV format. It should be noted that the center to edge distances $D_p$, $D_c$, and $D_H$ are different for each print format. Another difficulty of providing prints with a sound icon is that filmstrips may have been exposed in right-hand- or left-hand-load cameras. As shown in FIG. 3 of the present specification, a filmstrip 14 from a left-hand-load camera will present most of its images in an upright orientation when the film is fed in the direction of the arrow into the printer. In contrast, a filmstrip 16 from a right-hand-load camera will present most of its images in an inverted orientation when the film is fed in the same direction. In the familiar manner, such filmstrips are joined by a film splicing label 18 before they are processed; and the label remains with the filmstrips during subsequent printing from the developed negatives. To distinguish between filmstrips from left- and right-hand-load cameras, each label 18 may include a filmstrip or order number 20 and a code 22 to indicate the upright or inverted orientation of the following filmstrip. Such a technique is disclosed in commonly assigned European patent application No. 0 721 149 A2 published Jul. 10, 1996, the contents of which are incorporated by reference into this application. Even if the photofinisher's equipment can determine the different orientations or formats, or both, of such images, a print gate that places the sound icon in a fixed position will cause the icon to appear in a mixture of positions relative to the image, an unacceptable result for most customers.

To most efficiently provide a sound icon on prints made from images of different orientations and formats, it would be desirable to be able to determine the orientation and format of any image and then selectively position a sound icon printer mechanism so that the sound icon on all prints from a filmstrip would be positioned in the same orientation relative to their respective images. That is, all the icons would be along the lower edge in the corner of the film image and, preferably, in a preselected corner of the image.

SUMMARY OF THE INVENTION

It is an object of the invention to make provision for printing of a sound code on image prints in a manner that solves the problems described above. In accordance with one aspect of the invention, therefore, there is provided a method for producing photographic prints with a sound code icon printed thereon, that comprises the steps of intermittently conveying a filmstrip through a film strip gate for exposure of images on the filmstrip to photographic print paper; intermittently conveying a strip of photographic print paper through a print gate, the print gate defining an image print area for exposure to the filmstrip images; positioning a sound code icon printing device over said image print area; and actuating said icon printing device to expose a sound code icon onto said photographic print paper within said image print area in conjunction with exposure of a negative image onto said print paper.

In accordance with another aspect of the invention, photographic printer apparatus is provided that comprises means for intermittently moving filmstrips through a film gate; a print gate forming an image print area, said print gate including at least one sound code icon printer; means for intermittently moving photographic print paper through the print gate; illumination means for exposing each film image onto said print paper through the image print area of said print gate; means for positioning a sound code icon printer over said image print area; and means for actuating said icon printer to expose a sound code icon on the image print in conjunction with exposure of the film image onto said print paper.

In yet another aspect of the invention, a sound code printer is provided for exposing a circular sound code icon onto an image print on photographic print paper, the icon uniquely identifying the print image, wherein the icon comprises first and second circumferential rings each having binary coded segments uniquely identifying the image print. Segments of the first ring indicate frame number of a film image from which the image print is made on the paper and segments of the second ring indicate a number identifying the film strip on which the film image appears.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 4 illustrates schematically a photographic printer apparatus having a sound-on-print print gate embodying a feature of the present invention.

FIG. 5 illustrates schematically a side view of a sound-on-print print gate embodying a feature of the present invention.

FIG. 6 illustrates schematically a plan view of the print gate of FIG. 5.

DETAILED DESCRIPTION OF THE INVENTION

Figure 1:
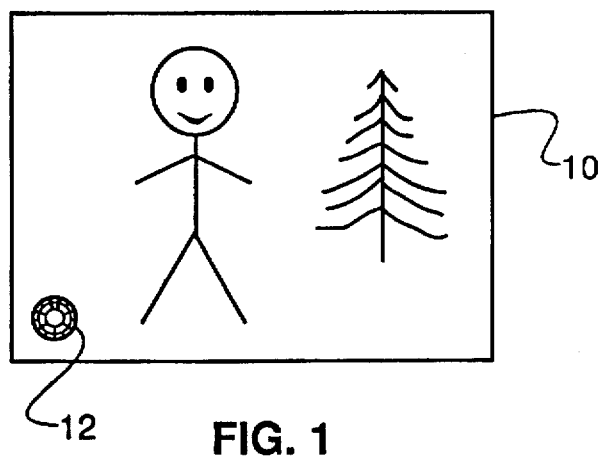
FIG. 1 illustrates schematically a photographic print with a sound code icon printed thereon.
Figure 2:
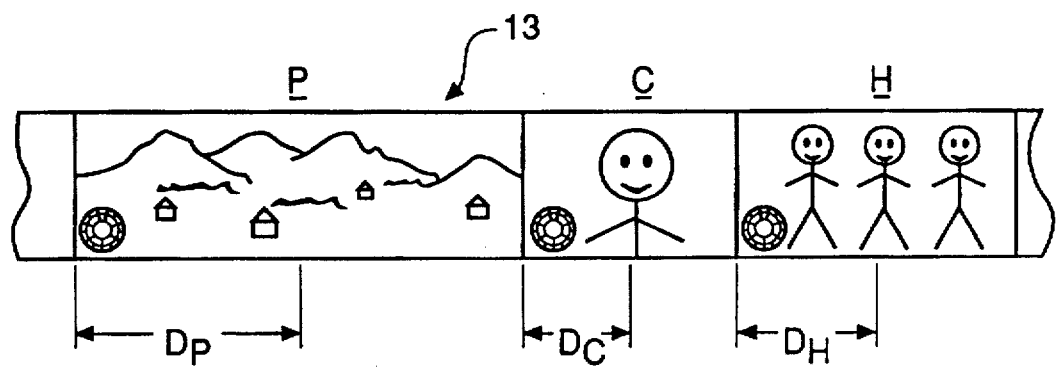
FIG. 2 shows a strip of developed print paper illustrating schematically a sequence of image prints having different print aspect ratios (formats).

FIG. 4 illustrates schematically a photographic printer embodying the invention. A supply reel 24 supports a wound strip made up of spliced, processed filmstrips 26. As the images on a filmstrip are sequentially exposed onto photographic paper, a take up reel 28 is rotated to wind up the spliced strip. Between the reels, a filmstrip print gate 30 flattens and supports each image on the filmstrip below an illumination source 32 as the filmstrip 26 is intermittently moved through the film gate. Light from source 32 passes through the image, through an adjustable iris 33 and through a projection lens system including a fixed lens element 34 and a movable lens element 35. Below the lens system, a supply roll 36 of photographic paper is rotated to provide a continuous strip 38 of paper on which the images are to be exposed. A takeup roll 40 is rotated to wind up the exposed paper. Between the rolls of paper, the paper is intermittently moved through a paper print gate 42 that includes a platen 44 to flatten and support the paper during exposure. To determine proper exposure conditions for each image and, if appropriate, to help detect panoramic or HDTV images or to help determine the orientation of individual images, a conventional electronic scanner 46 may be included. To read information recorded magnetically on the filmstrip, a magnetic read head 48 may be included. Also, to read information recorded optically on the filmstrip, an optical read head 50 may be included. In the conventional manner, a programmable controller 52 is connected to drive systems, not shown, for the filmstrip and paper and to scanner 46 and read heads 48,50. Thus, in the familiar manner, each image is scanned and any associated magnetic or optical codes are read as the image moves to gate 30. The illumination system, iris and lens system are then adjusted as appropriate to expose the image properly onto the photographic paper. To provide sound code icons on the prints in accordance with the invention, a sound-on-print print gate 60 is provided between the illumination source and the print paper. The sound-on-print print gate 60 includes a pair of sound icon printers 64,66 provided along opposite edges of the paper print gate 42 relative to the direction of movement of the paper. As will be seen, one of the sound icon printers is movably positioned in the image print area for exposure of a sound icon in conjunction with exposure of the film image onto the print paper in the image print area of the print gate 60.

Referring now jointly to FIGS. 5 and 6, FIG. 5 illustrates details of the print gate 60 adapted to print sound code icons on a strip of photographic print paper 62. FIG. 6 shows in plan view more details of the print gate 60. Print gate 60 includes first and second sound icon printers 64 and 66. Sound icon printer 64 is shown in the position used for the exposure of normal 3R, 4R and 5R prints where the 3R, 4R and 5R designations refer to different sized prints, namely 3R (4×5 inch; 101.6×127 mm), 4R (4×6 inch; 101.6×152.4 mm) and 5R (5×7 inch; 127×177.8 mm). The sound icon printer 64 is used for printing the sound icon 12 when the print image 68 is oriented normally. A second sound icon printer 66 is used for printing the sound icon 12 when the print image 68 is inverted. Sound icon printers 64 and 66 are mounted on pivotable arms 70 and 72, respectively, for rotation in and out of the image exposure area 74 in the directions shown by arrows 76 and 78. Arms 70,72 are rotated by actuator motors 80 and 82, respectively, which are powered through lines 84 and 86 from a power supply 88. Timing of the actuator motors is controlled by logic and control computer 20 via lines 90 and 92 respectively. Sound icon printer 64 is shown rotated into its printing position and sound icon printer 66 is shown rotated out of the printing position. In addition to being able to be rotated into and out of printing position both sound icon printers 64 and 66 can be moved parallel to the path of the print paper 62. The direction of movement of the print paper is indicated by arrow 94 and the translational movement of the sound icon printer 64 and 66 parallel to the paper path is indicated by arrows 95 and 96, respectively. Sound icon printers 64 and 66 are driven into position along tracks 100 and 102 by motors 104 and 106 powered, respectively, via lines 108 and 110 by power supply 88. The timing and amount of translation is controlled by logic and control computer 20 via control logic lines 112 and 114. Motor 104 turns the threaded lead screw 116 which is mounted to the sound print gate 60 by mounting steps 120 and 122. Threaded lead screw 116 engages sound icon printer 64 through the threaded drive connection step 124. Motor 106 turns the threaded leaded screw 118 which is mounted to the sound print gate 60 by mounting steps 128 and 130. Threaded lead screw 118 engages sound icon printer 66 through the threaded drive connection step 126.

Figure 7:
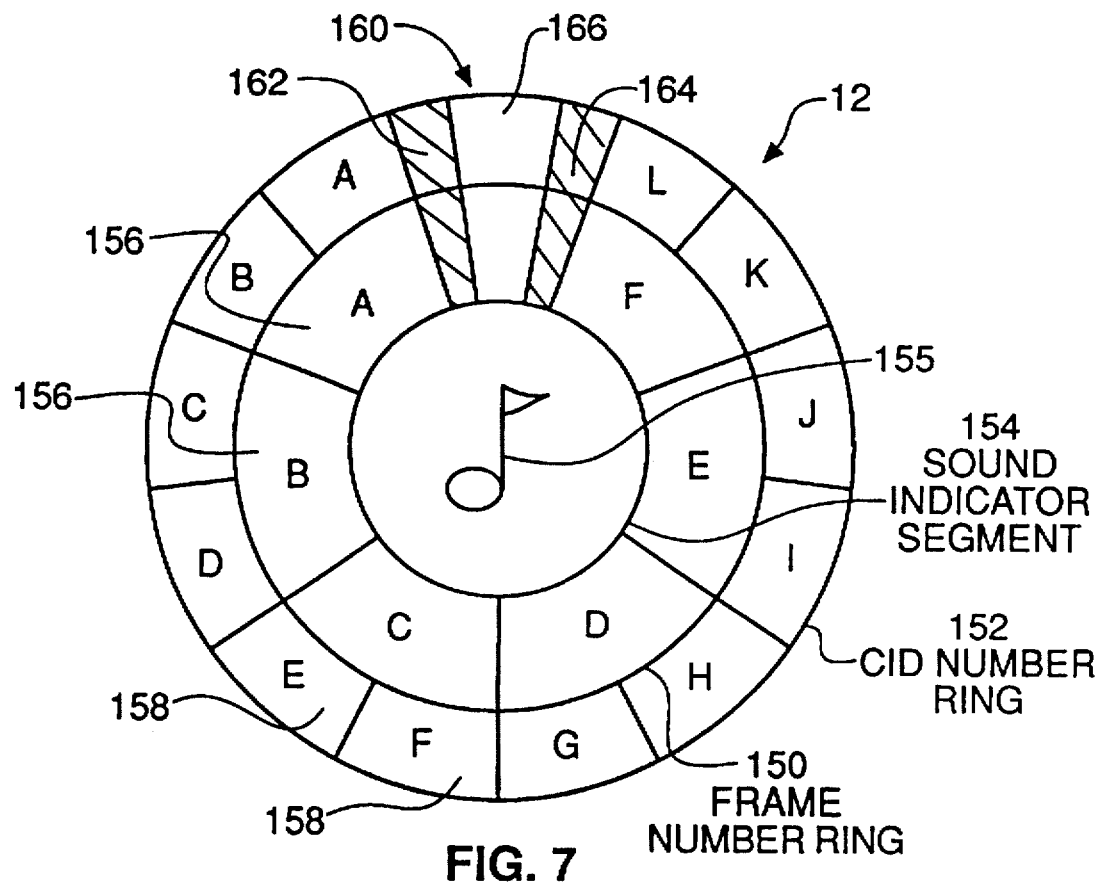
FIG. 7 is a schematic illustration of a sound code icon of the type useful with the present invention.
Figure 7A:
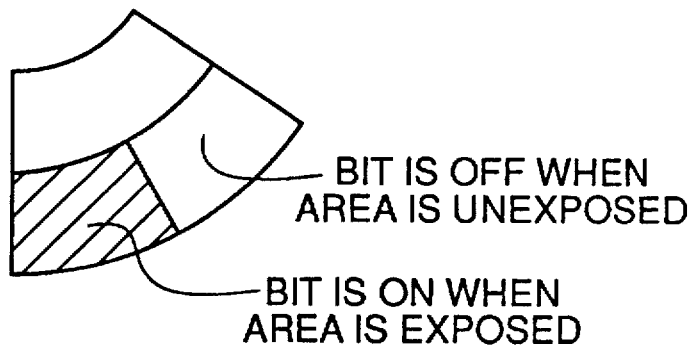

The sound code printer 64 uses an LED print head 132 and sound code printer 66 uses an LED print head 134 to print the sound print icon 12, an example of which is described more detail in connection with FIG. 7. The printing of the code is controlled by logic and control computer 20 through lines 136 and 138 respectively. The LED print heads are powered by power supply 88 through power lines 140 and 142, respectively.

FIG. 7 illustrates an exemplary format useful as the sound icon 12 although it will be appreciated that the invention is not limited to a particular icon format. For example, an icon comprised of a linear bar code may be employed. In the illustration of FIG. 7, the icon 12 is generally composed of concentric rings 150 and 152 formed about an inner circular segment 154. These rings comprise a plurality of segments providing binary coded data uniquely identifying the associated print image. The inner ring 150 comprises a plurality of segments 156, of equal area, that identify the film frame number of the image print. The outer ring 152 comprises a plurality of equal area segments 158 that are used to identify the cartridge identification (CID) number which uniquely identifies the film strip. In the illustrated embodiment, there are seven equal area segments in the inner ring 150 and 12 equal area segments in the outer ring 152. By controlling the LED printer to expose, or not expose, selected segments in the icon, a binary code is produced that represents the appropriate frame number and CID number that uniquely identifies the print image. One radially extending segment 160 is always printed with a fixed, pre-defined alignment pattern. The binary value of any given segment in the inner and outer rings is determined by the angular distance of the segment from the alignment pattern. In the illustrated alignment pattern, a 25% area 162 is printed dark followed by a light 50% area 166 and ending with a dark 25% area 164. This same pattern extends radially across both inner and outer segments 150 and 152. A binary table for the illustrated icon is shown in Table I.

TABLE I

| ICON SEGMENT | VALUE |
| --- | --- |
| A | 1 |
| B | 2 |
| C | 4 |
| D | 8 |
| E | 16 |
| F | 32 |
| G | 64 |
| H | 128 |
| I | 256 |
| J | 512 |
| K | 1024 |
| L | 2048 |

The inner circular segment 154 comprises a sound indicator segment which may show a symbol such as musical note 155. This symbol, when present, may be used to indicate that sound exists for the associated print image at the time of print development. Absence of the symbol 155 may be used to indicate that no sound exists at the time of photofinishing. However having the remainder of the code printed on the print allows the owner to record sound later, if desired, and to utilize the number code to uniquely associate the subsequently recorded sound with the image print.

Figure 8:
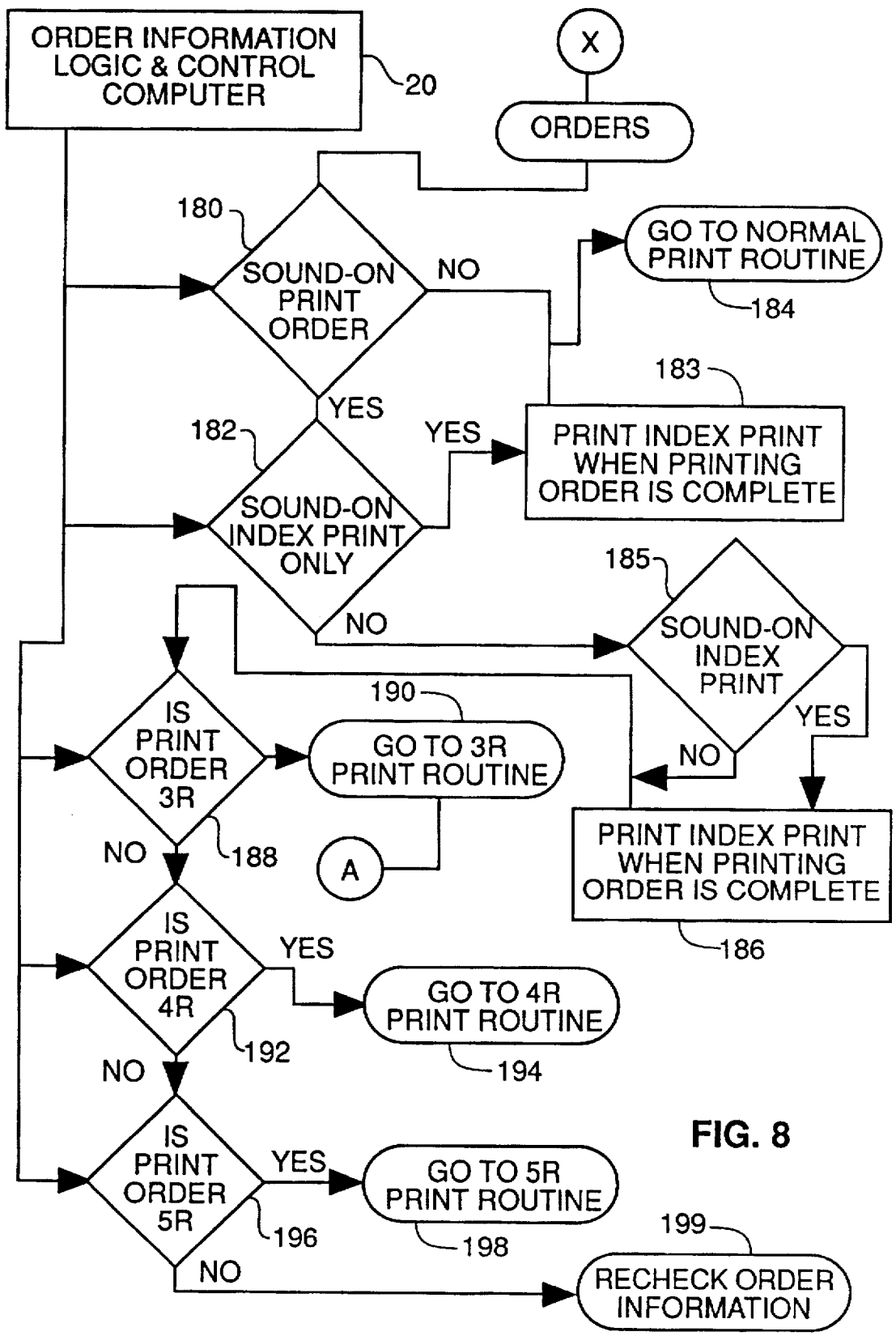
FIGS. 8–10B are flow charts illustrating various stage of the method of the invention.

FIGS. 8–10B are flow charts showing the method of operation of a photographic printer embodying the invention. FIG. 8 is a schematic showing the steps in the sound-on-print printer order sort routine. The order enters the sound-on-print printer order sort routine at "X" where the sound-on-print printer order sort routine sorts each order by using information obtained from the order information logic and control computer 20. At step 180, the photofinisher inputs information to the system via computer 20 concerning whether a given original order or a reorder is to have prints with the sound icon recorded thereon ("sound-onprints") and the size of the prints to be produced, i.e. 3R, 4R, or 5R. In the case of reorder prints using the Universal Reorder System (URS) or Kodak Reorder System (KRS), information regarding sound icon on prints may be provided by a computer disk for URS or by a punch code tape attached to the reorder negatives for KRS. If query 180 determines that the printing of the sound icon on prints is not requested, the system proceeds to a normal print routine at step 184. If sound-on-prints is requested, the system proceeds to step 182. At step 182, the order information logic and control computer 20 answers the query as to whether the sound should be printed on each print or only on the index print. If only on the index print, step 183 sets an action flag to cause the index print to be printed with the sound icon and the routine branches at step 184 to normal print routine. If not solely on the index print, step 185 determines if the sound icon is to be printed on the index print (as well custom prints) and if so, step 186 sets an index print sound icon action flag after which the routine proceeds to step 188. If only the sound icon is to be printed solely on the prints, the routine goes directly to step 188. One of the 3R, 4R or 5R print routines as determined at steps 188/190, 192/194 and 196/198. If the print size has not been specified, the system returns at step 199 to step 180.

Figure 9:
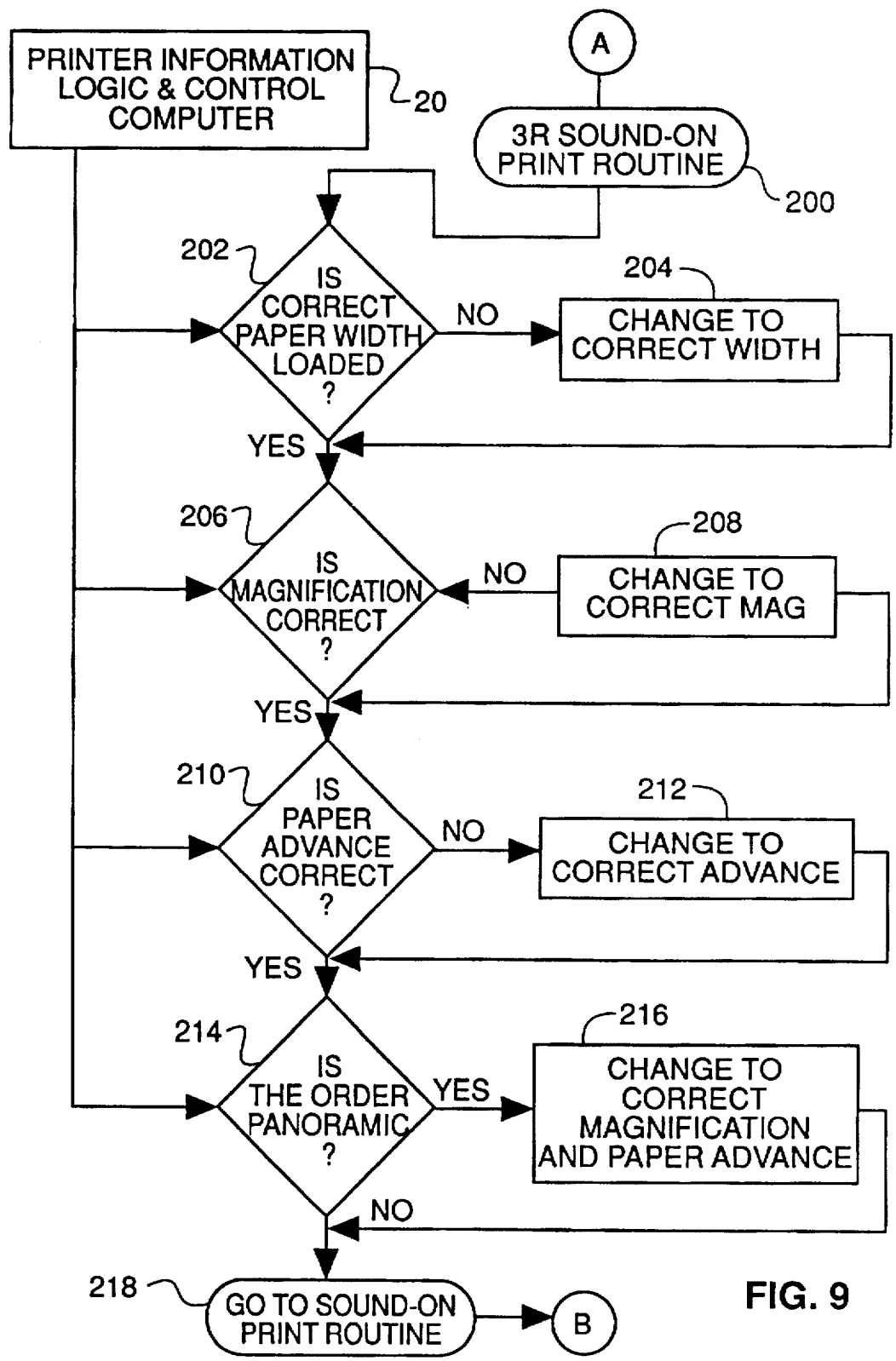

FIG. 9 shows the print routine for 3R prints, those for 4R and 5R being substantially identical. Instruction for 3R prints is received at step 200 and paper width is checked at step 202. If the incorrect paper is present, a change is made at step 204. If the correct paper is present, the magnification setting of the lens system is checked at step 206. If the magnification is not correct, a change is made at step 208. If the magnification is correct, the status of the paper advance system is checked at step 210. If the advance system is not correct, a change is made at step 212. If the advance system is correct, the print order is checked at step 214 to see if all panoramic prints are requested. If all panoramic prints are requested, the paper advance and magnification are adjusted at step 216. The system then proceeds to a sound-on-print routine at step 218.

Figure 3:
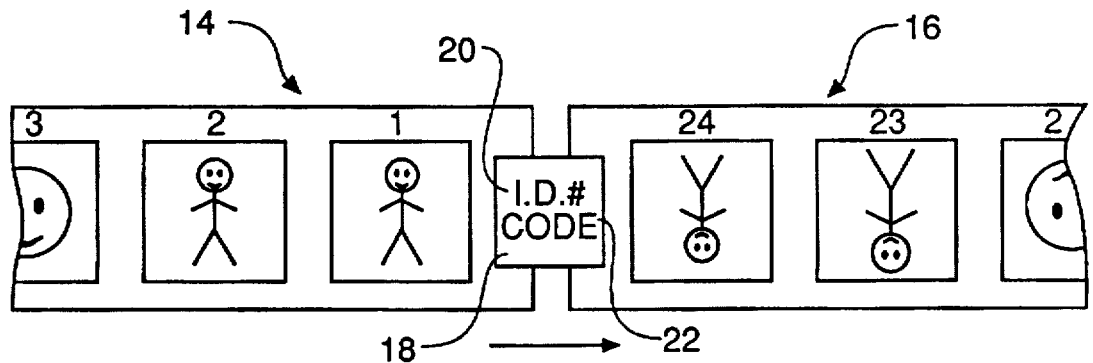
FIG. 3 illustrates schematically a developed filmstrip which was exposed in a left-hand-loaded camera and a developed filmstrip which was exposed in a right-hand-loaded camera, the filmstrips being joined by a splice label.
Figure 10A:
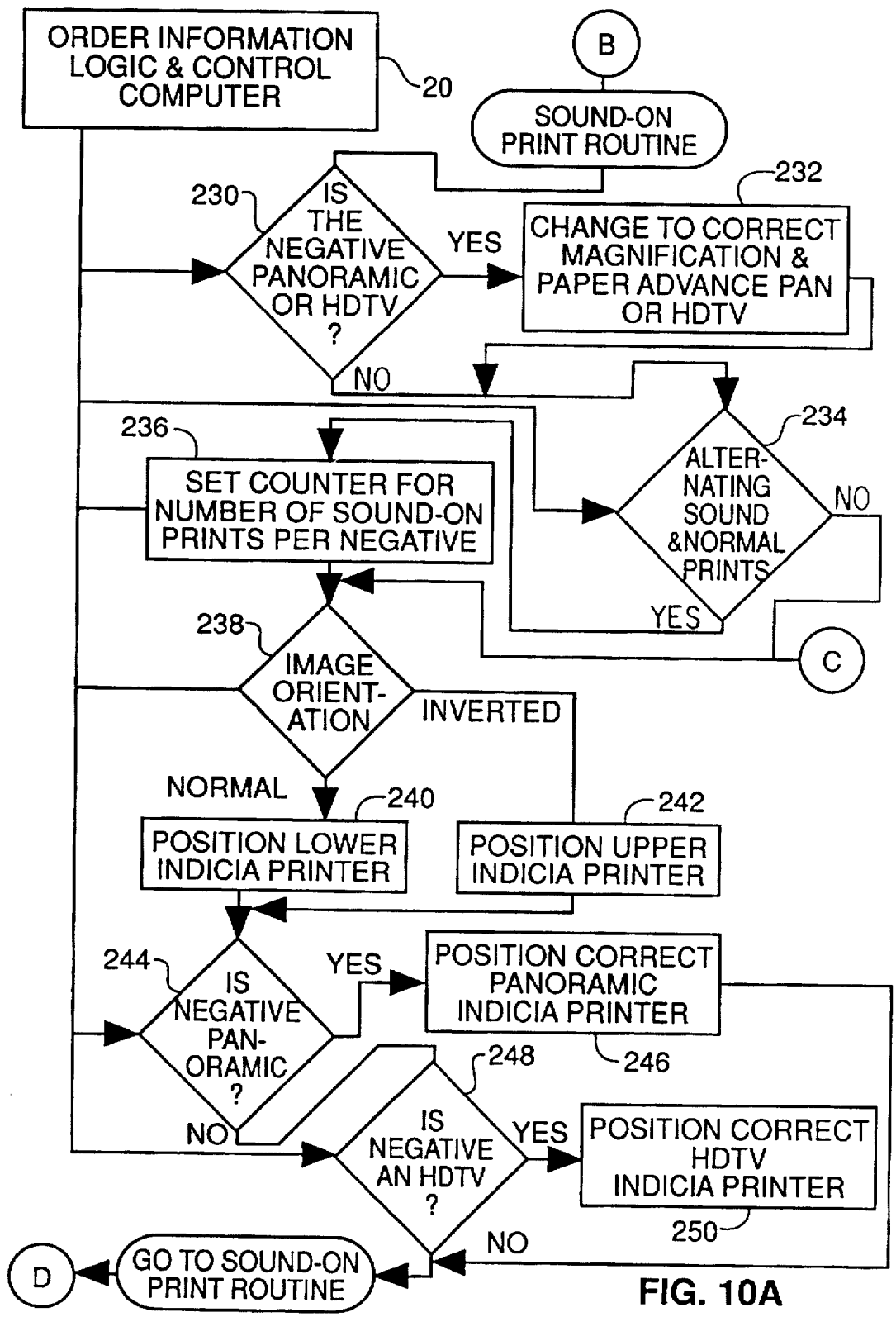
Figure 10B:
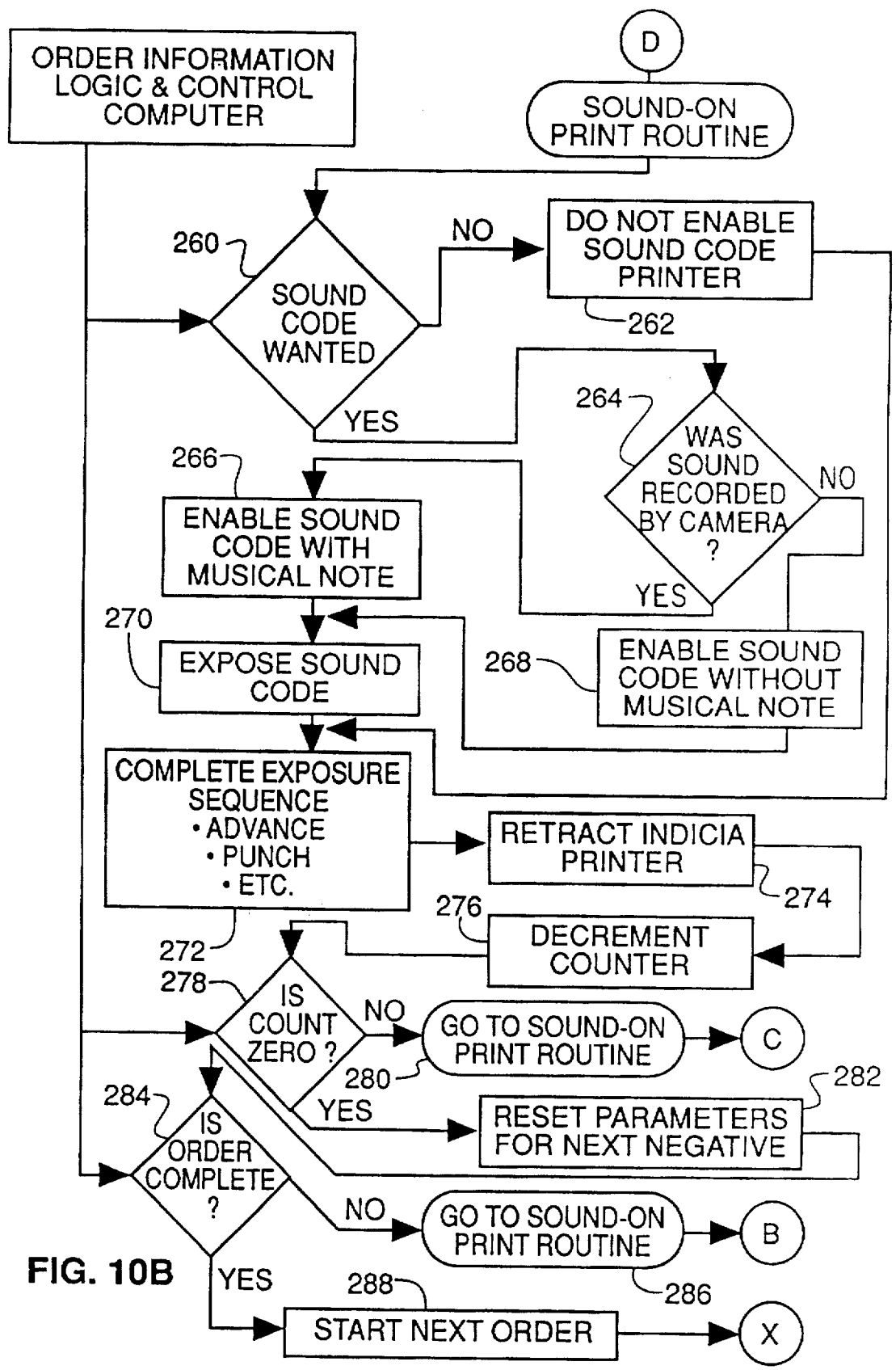

FIGS. 10A,10B show the steps in the sound-on-print printer print routine. In FIG. 10A, the sound-on-print order routine enters at point "B". Using information obtained from the order information logic and control computer 20 fed into decision step 230, it is determined if the sound-on-print negative is a panoramic or HDTV print negative. If the sound-on-print negative is a panoramic or HDTV print negative, the routine waits until the correct magnification and printer paper advance are automatically set on the printer at step 232 before proceeding to decision step 234. Using information obtained from the order information logic and control computer 20 fed into decision step 234, it is determined if the sound-on-print order is asking for alternating normal prints (no sound icon) and sound-on-prints from each negative or if sound-on-print order is asking for a sound-on-print on all prints from each negative. The customer, for example, may which to have multiple prints from each negative but have only one or two of the group carry the sound icon. If the sound-on-print order is asking for alternating normal prints and sound-on-prints from each negative, step 236 automatically sets a counter for the number of sound-on-prints desired for each negative before proceeding to decision step 238; otherwise the routine goes directly to decision step 238. Using information obtained from the order information logic and control computer 20 fed into decision step 238, it is determined if the sound-on-print negative is inverted, or if the sound-on-print negative is oriented normally. If normal (not inverted), step 240 causes activation of motor 80 to rotate icon printer 64 into position over the image print area. If inverted, step 242 activates motor 82 to position icon printer 66 over the image print area. Using information obtained from the order information logic and control computer 20 fed into decision step 244, it is determined if the sound-on-print negative is a panoramic negative, or if sound-on-print negative is not a panoramic negative. If the sound-on-print negative is a panoramic negative, the selected icon printer is positioned by step 246 at the extreme of its translation track to place the printer in the corner of the image print. If not a panoramic print, step 248 determines if it is an HDTV print and, if so, step 250 activates the printer motor to position the icon printer at an intermediate position corresponding to the location of the corner of the HDTV print image area. If neither a panoramic nor HDTV print, the icon printer remains at its default position corresponding to the corner of the C print shown in FIG. 3. After the icon printer is properly positioned, the routine proceeds to point "D" for entry into the remainder of the sound-on-print routine.

FIG. 10B shows the remainder of the sound-on-print routine. Using information obtained from the order information logic and control computer 20 fed into decision step 260, it is determined if the sound-on-print order requires the sound icon of the sound-on-print. If the sound icon is required, the routine proceeds to decision step 264. If the sound icon is not required, the sound icon printer is not enabled, step 262, and the routine proceeds to action step 272. If the sound icon is required, then, using information obtained from the order information logic and control computer 20 fed into decision step 264, it is determined if the sound for the sound-on-print order was recorded by the camera. If the sound for the sound-on-print order was recorded by the camera, action step 266 conditions the sound icon printer to include the music note 155 within the center segment 154 of the sound icon 12; otherwise the music note is not enabled, step 268. The sound-on-print routine now proceeds to action step 270 causing the sound icon is to be exposed. At action step 272, the exposure sequence of the print is completed, the paper is advanced, and punched. Step 274 retracts the icon printer and step 276 decrements the counter which is tracking the number prints to carry the sound icon for this negative. At decision step 278, using information obtained from the order information logic and control computer 20, it is determined if the count on the counter set in action step 236 in FIG. 10A is zero. If not, step 280 returns the routine to point "C" of the sound-on-print routine (FIG. 10A) to incorporate the sound icon on the next print. If the count on the counter set in action step 236 is zero, the routine proceeds to action step 282 and the parameters are reset for the next negative. The routine then proceeds to decision step 284 where it is determined if the order is complete and, if not, step 286 returns the routine to the beginning of the sound-on-print routine at point "B" (FIG. 10A). If the order is complete, step 288 returns the routine to point "X" to commence processing of the next film order.

Figure 11:
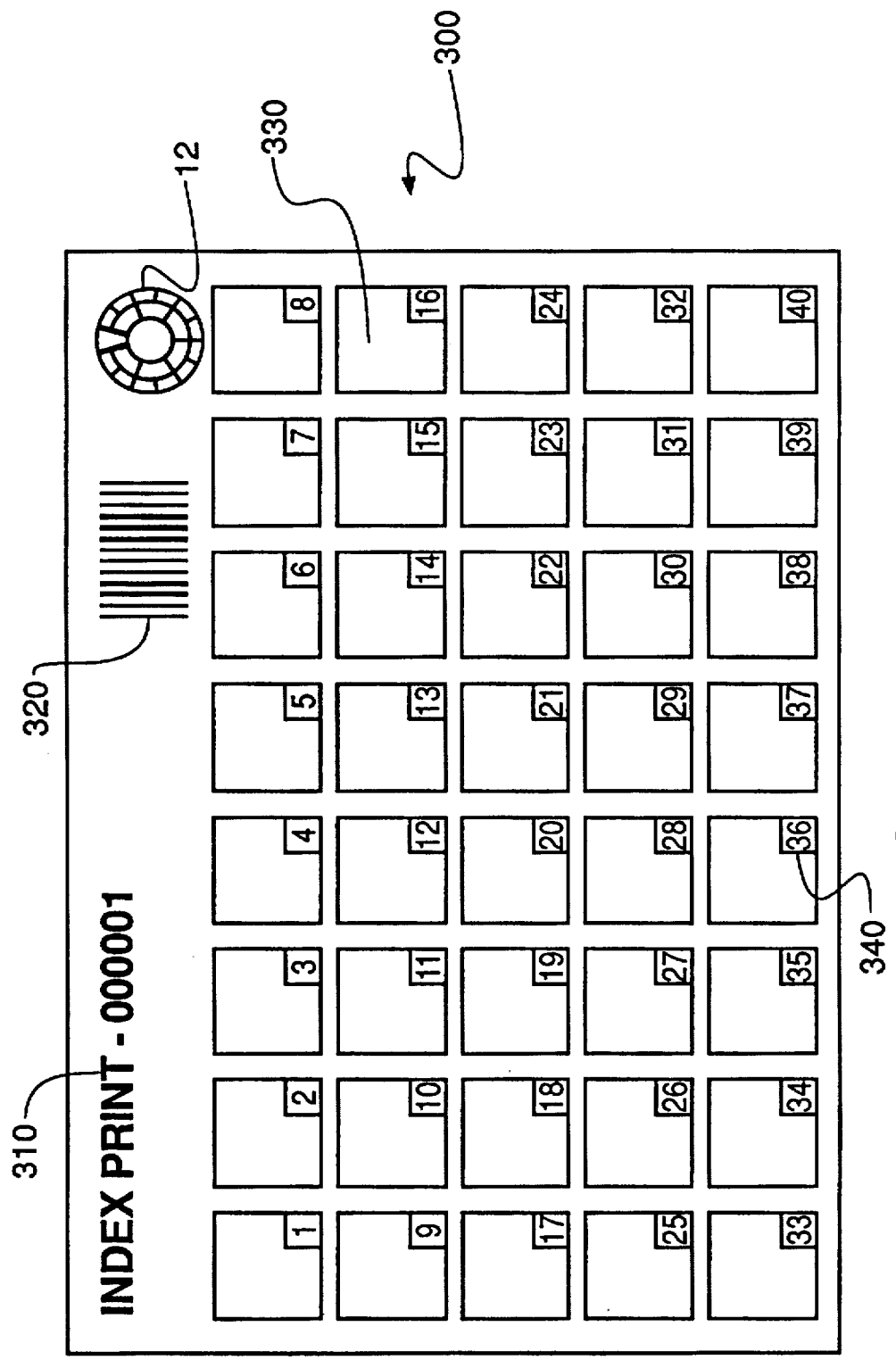
FIG. 11 is an illustration of an index print carrying a sound icon printed thereon.

FIG. 11 illustrates a sound-on-print index print 300 which bears a unique identification number ("000001") which appears in eye readable form 310 and in bar coded form 320. The sound-on-print 300 displays all the images 330 in a specific photographic order. Usually there is space on the sound-on-print index print 300 for forty images and the images are identified by their frame numbers 340. The sound icon can be printed in the upper right hand corner in a manner similar to its location on an inverted print and positioning of the icon printer can be selected be an additional decision step during the positioning routine (FIG. 10A) in the same manner as positioning for the inverted image print.

The invention has been described with reference to a preferred embodiment. However, it will be appreciated that variations and modifications can be effected by a person of ordinary skill in the art without departing from the scope of the invention.

PARTS LIST 88 power supply
10 photographic print 90,92 actuator signal control lines
12 sound code icon 94 print paper travel direction arrow
13 developed strip of print paper 95,96 icon printer translation arrows
14 filmstrip (left hand load) 40 100,102 icon printer translation tracks
16 filmstrip (right hand load) 104,106 icon printer translation actuator
18 film splicing label motors
20 film order ID number 108,110 motor power lines
22 orientation code number 112,124 control logic lines
24 film supply reel 45 116,118 threaded lead screws
26 spliced, processed filmstrips 120,122,128,130 mounting steps
28 take up reel 124,126 threaded drive connection steps
30 filmstrip print gate 132,134 LED print heads
32 illumination source 136,138 LED print head control lines
33 adjustable iris 50 140,142 LED print head power lines
34 fixed lens element 150,152,154
35 movable lens element 155 musical note symbol
36 print paper supply roll 156 frame number code segments
38 strip of photographic print paper 158 CID number code segments
40 paper take up roll 55 160 alignment segment
42 paper print gate 162,164 dark sections of alignment
44 platen segment
46 scanner
48 magnetic read head
50 optical read head
52 programmable print controller
60 sound-on-print print gate
62 photographic print paper
64,66 sound icon printers
68 print image
70,72 icon printer mounting arms
74 image exposure area
76,78 rotation directions
80,82 arm actuator motors
84,86 motor poser lines

What is claimed is:

1. A method for producing photographic prints with a sound code icon printed thereon, comprising the steps of:

intermittently conveying a filmstrip through a film strip gate for exposure of images on the filmstrip to photographic print paper;

intermittently conveying a strip of photographic print paper through a print gate, the print gate defining an image print area for exposure to the filmstrip images;

positioning a sound code icon printing device over said image print area; and actuating said icon printing device to expose a sound code icon onto said photographic print paper within said image print area in conjunction with exposure of a negative image onto said print paper.

2. The method of claim 1 wherein said positioning of the sound icon printing device includes selecting a printer from a pair of such devices located adjacent opposite edges of the print paper in the direction of motion of the paper through the print gate.

3. The method of claim 2 further including the step of:

determining an orientation of images on the filmstrip to identify orientation of the image relative to the print gate; and selection of said sound icon printer device is in response to said determined image orientation such that a sound icon is printed near the bottom edge of at least a majority of said image prints.

4. The method of claim 1 including the steps of:

generating a sequence of individual codes each uniquely identifying an image frame within a filmstrip; and selecting an individual code from said sequence for exposure to said print such that said print is uniquely identified with its associated image frame.

5. The method of claim I wherein multiple prints are made of each film image and printing of the sound icon is omitted for at least one print of each film image.

6. The method of claim 1 including the steps of:

determining the number of prints to be made from a film image on which said sound icon is to be printed; and if said number of prints to be made with the sound icon is less than the number of prints to be made from the film image, positioning said icon printer over the image print area until the number of prints with the sound icon is made and thereafter repositioning the icon printer out of the image print area for making of the remaining prints not bearing the sound icon print.

7. The method of claim 1 including the steps of:

determining format of the print to be made from the film image; and translationally moving the sound icon printer along an edge of the image print area parallel to direction of travel of the print paper so as to position the sound icon print near a corner of the image print.

8. The method of claim 1 further including the step of determining if a sound recording is currently associated with a print to be made and, if so, exposing a symbol as part of the sound icon to indicate that fact, otherwise omitting exposure of said symbol.

9. Photographic printer apparatus comprising:

means for intermittently moving filmstrips through a film gate;

a print gate forming an image print area, said print gate including at least one sound code icon printer;

means for intermittently moving photographic print paper through the print gate;

illumination means for exposing each film image onto said print paper through the image print area of said print gate;

means for positioning a sound code icon printer over said image print area; and means for actuating said icon printer to expose a sound code icon on the image print in conjunction with exposure of the film image onto said print paper.

10. Printer apparatus according to claim 9 further including means for determining at least predetermined physical feature of an image print to be made from said film image and said positioning means is responsive to said determining means for movably locating said icon printer to a position in the image print area dictated by said at least one determined physical feature of the image print.

11. Printer apparatus according to claim 10 wherein said physical feature is the orientation of the image print relative to the print gate.

12. Printer apparatus according to claim 10 wherein said physical feature is the format of the image print.

13. Printer apparatus according to claim 9 wherein said print gate includes a pair of sound code icon printers located on opposite sides of the print gate in the direction of motion of the paper through the print gate.

14. Printer apparatus according to claim 13 further including means for determining whether said film strip is of normal or inverted orientation and means responsive to said normal or inverted determining means for selecting one of said pair of icon printers which would place an icon printed therefrom at the bottom of at least a majority of the prints made from said film strip.

15. Printer apparatus according to claim 9 including means for determining number of sound icon prints to be printed for each film image and means for actuating said icon for said number of prints and for disabling said icon printer for any remaining number of prints from said film image that are not to have said sound icon printed thereon.

16. Printer apparatus according to claim 9 including means for determining if a sound recording is currently associated with a print to be made and, if so, for exposing a symbol as part of the sound icon to indicate that fact, and for omitting exposure of said symbol if a sound recording is not currently associated with the print to be made.

17. Print gate for a photographic printer comprising:

at least one movable sound code icon printer movable into position within a print image area for printing a sound code icon on photographic paper in the print gate in conjunction with exposure of a film image onto said paper in the print gate.

18. The print gate of claim 17 further including a pair of sound code icon printers located on opposite sides of the print gate in the direction of motion of the paper through the print gate.

19. The print gate of claim 17 wherein said sound icon printer is mounted on a pivotable arm for rotation into and out of an image print area.

20. The print gate of claim 17 further including means for translationally moving said sound icon printer along one side of said print gate parallel to direction of paper travel through the print gate for positioning of said icon printer at a predetermined position determined by format of a print to be made.

21. A sound code printer for exposing a circular sound code icon onto a image print on photographic print paper, the icon uniquely identifying the print image, the icon comprising first and second circumferential rings each having binary coded segments uniquely identifying the image print, segments of the first ring indicating frame number of a film image from which the image print is made on the paper and segments of the second ring indicating a number identifying the film strip on which the film image appears.

22. The sound code printer of claim 21, having means for exposing an additional area within the icon with a selected symbol that indicates a sound recording is associated with an image print being made and for omitting said symbol if there is no associated sound recording.

* * * * *

UNITED STATES PATENT AND TRADEMARK OFFICE
CERTIFICATE OF CORRECTION

PATENT NO.   : 5,757,468
DATED        : 26 May 1998
INVENTOR(S)  : David Lynn Patton, et al It is certified that error appears in the above-identified patent and that said Letters Patent is hereby corrected as shown below:

On the title page, item [76], after "David Lynn Patton" insert --Webster, New York--; after "Stephen John Rowan" insert --Spencerport, New York--; after "Cynthia Sue Bell", insert --Webster, New York--; please delete "all of Eastman Kodak Company, Rochester, N.Y. 14650".

Signed and Sealed this

Twenty-second Day of December, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,757,468
DATED : May 26, 1998
INVENTOR(S) : Patton et al.

It is certified that error appears in the above-identified patent and that said Letters Patent is hereby corrected as shown below:

On the title page insert -- [73] Assignee: Eastman Kodak Company, Rochester, New York --.

Signed and Sealed this

Fifteenth Day of June, 1999

*Attest:*

Q. TODD DICKINSON

*Attesting Officer*  *Acting Commissioner of Patents and Trademarks*